United States Patent
Drzal et al.

(10) Patent No.: US 6,648,973 B2
(45) Date of Patent: Nov. 18, 2003

(54) PROCESS FOR THE TREATMENT OF A FIBER

(75) Inventors: Lawrence T. Drzal, Okemos, MI (US); Michael J. Rich, Williamston, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 10/277,843

(22) Filed: Oct. 22, 2002

(65) Prior Publication Data

US 2003/0066479 A1 Apr. 10, 2003

Related U.S. Application Data

(60) Division of application No. 09/882,974, filed on Jun. 15, 2001, which is a continuation-in-part of application No. 09/287,978, filed on Apr. 7, 1999.

(51) Int. Cl.$^7$ ............... C23C 16/00; H05H 1/00; H05H 1/02
(52) U.S. Cl. ............... 118/718; 118/722; 118/67; 118/68; 156/345.5; 427/534
(58) Field of Search ............... 118/50.1, 620, 118/722, 718, 641, 642, 67, 68; 156/345.5; 427/534, 538, 539, 553, 558, 559

(56) References Cited

U.S. PATENT DOCUMENTS

| | | |
|---|---|---|
| 3,723,607 A | 3/1973 | Kalnin |
| 3,754,957 A | 8/1973 | Druin |
| 3,890,176 A | 6/1975 | Bolon et al. |
| 4,717,516 A | 1/1988 | Isaka et al. |
| 4,756,765 A | 7/1988 | Woodroffe |
| 4,803,021 A | 2/1989 | Werth et al. |
| 4,810,434 A | 3/1989 | Caines |
| 4,832,932 A | 5/1989 | Tada et al. |
| 4,867,796 A | 9/1989 | Asmus et al. |
| 4,919,077 A * | 4/1990 | Oda et al. ............... 118/723 MP |
| 5,019,210 A | 5/1991 | Chou et al. |
| 5,098,618 A | 3/1992 | Zelez |
| 5,281,798 A | 1/1994 | Hamm et al. |
| 5,357,005 A | 10/1994 | Buchwalter et al. |
| 5,500,459 A | 3/1996 | Hagemeyer et al. |
| 5,512,123 A | 4/1996 | Cates et al. |
| 6,325,017 B1 * | 12/2001 | DeBoer et al. ............... 118/723 R |
| 6,419,743 B1 | 7/2002 | Stowe |
| 6,419,749 B1 | 7/2002 | Rhoades |

FOREIGN PATENT DOCUMENTS

GB 723631 2/1955

OTHER PUBLICATIONS

Bolon et al "Ultraviolet Depolymerization of . . . " Poly. Eng. and Sc., V 12 pp 109–111 ('72).
(Walzak et al, "UV and Ozone Treatment of . . . " In: Poly. Sur. Modi.: Rel. to Adh., Mittal (Editor), pp 253–272 ('95)).
Strobel et al, "A Com. of gas– . . . " Jour. of Adh. Sci. and Tech., pp: 365–383 ('95).
Dontula et al, "A study of polymer . . . " Proceed. of 20th Ann. Adh. Soc. Meet., Hilton Head ('97).
Weitzsacker et al, "Utilizing x–ray . . . " Proceed. of 20th Ann. Adh. Soc. Meet, Hilton Head ('97).
Weitzsacker et al, "Surface pretreatment . . . " Proceed. of ACCE'97, Detroit, MI.
Dontula et al, "Surface activation of . . . " Proceed. of Soc. of Plas. Eng. ANTEC'97, Toronto.
Haack et al, 22nd Adhesion Society Meeting (Feb. 22–24, 1999).

* cited by examiner

Primary Examiner—Parviz Hassanzadeh
(74) Attorney, Agent, or Firm—Ian C. McLeod

(57) ABSTRACT

A process using ultraviolet light having a wavelength of 160 to 500 nanometers without higher wavelengths and a high intensity between about 1 and 40 watts/cm$^2$ to surface treat a carbon containing fiber is described. The treated fiber contains an enhanced amount of oxygen on the surface which significantly improves the bondability of the fiber in composites.

6 Claims, 2 Drawing Sheets

PROCESS FOR THE TREATMENT OF A FIBER

CROSS-REFERENCE TO RELATED APPLICATION

This application is a division of application Ser. No. 09/882,974, filed Jan. 15,2001, which is a continuation-in-part of application Ser. No. 09/287,978, filed Apr. 7, 1999.

STATEMENT REGARDING FEDERALLY SPONSORED RESEARCH OR DEVELOPMENT

None

BACKGROUND OF THE INVENTION (1) Field of the Invention

The present invention relates to a process for treating moving fibers using high intensity ultraviolet light between 160 and 500 nm without higher wavelengths and ozone. The treatment enhances the strength of the fiber and bondability of the fiber is improved by increasing the oxygen in contact with the surface of the fiber.

(2) Description of the Related Art

In general, manufactured surfaces of substrates, such as the adhereneds in adhesive joints or reinforcing fibers in composites, usually contain undesirable compounds or additives that limit or reduce adhesion to an adhesive or paint film. Hence, surface preparation, which includes cleaning and activation of the surfaces, of polymeric, polymer composite, fibers or metal substrates is carried out prior to applying protective paint films or adhesive bonding. Surface preparation determines the mechanical and durability characteristics of the composite created. Currently, the techniques used for surface preparation are mechanical surface treatments (e.g. abrasion), solvent wash and chemical modification techniques like corona, plasma, flame treatment and acid etching. Each of the existing processes have shortcomings and thus, they are of limited use. Abrasion techniques create dust and abrasive wear waste, are found to be time consuming, labor intensive and have the potential to damage the adherent surface. Use of organic solvents results in volatile organic chemical (VOC) emissions. Wet chemical techniques (such as acid etching) are costly, create waste that must be disposed of or recycled and need tight control. Dry chemical methods (such as plasma etching) are usually batch processes and of limited use with regard to treating three dimensional parts.

The use of lasers for surface treatment is known in the art. The focused beams of the lasers make it difficult to treat a large surface or non-regular surfaces such as fiber tows containing thousands of fibers. U.S. Pat. No. 4,803,021 to Werth et al describes such a method. U.S. Pat. No. 4,756,765 to Woodroffe describes paint removal with surface treatment using a laser.

Plasma treatment of surfaces is known in the art. Relatively expensive equipment is necessary for such treatments and plasmas are difficult to control. The surfaces are treated with vaporized water in the plasma. Illustrative of this art are U.S. Pat. Nos. 4,717,516 to Isaka et al., 5,019,210 to Chou et al., and 5,357,005 to Buchwalter et al.

A light based process which cleans a substrate surface also creates a beneficial chemistry on the surface for adhesive bonding and paintability is described in U.S. Pat. No. 5,512,123 to Cates et al. The process involves exposing the desired substrate surface to be treated to flashlamp radiation having a wavelength of 160 to 5000 nanometers. Ozone is used with the light to increase the wettability of the surface of the substrate being treated. Surfaces of substrates such as metals, polymers, polymer composites are cleaned by exposure to the flashlamp radiation. The problem with the Cates et al process is that the surface of the substrate is heated to a relatively high temperature, particularly by radiation above 500 nanometers and relatively long treatment times. Related patents to Cates et al are U.S. Pat. Nos. 3,890,176 to Bolon, 4,810,434 to Caines; 4,867,796 to Asmus et al; 5,281,798 to Hamm et al and 5,500,459 to Hagemeyer et al and U.K. Patent No. 723,631 to British Cellophane. Non-patent references are: Bolon et al., "Ultraviolet Depolymerization of Photoresist Polymers", Polymer Engineering and Science, Vol. 12 pages 109 to 111 (1972). M. J. Walzak et al., "UV and Ozone Treatment of Polypropylene and poly(ethylene terephthalate)", In: Polymer Surface Modification: Relevance to Adhesion, K. L. Mittal (Editor), 253 to 272 (1995); M. Strobel et al., "A Comparison of gas-phase methods of modifying polymer surfaces", Journal of Adhesion Science and Technology, 365 to 383 (1995); N. Dontula et al., "A study of polymer surface modification using ultraviolet radiation", Proceedings of 20th Annual Adhesion Society Meeting, Hilton Head, S.C. (1997); C. L. Weitzsacker et al., "Utilizing X-ray photoelectron spectroscopy to investigate modified polymer surfaces", Proceedings of 20th Annual Adhesion Society Meeting, Hilton Head, S.C. (1997); N. Dontula et al., "Ultraviolet light as an adhesive bonding surface pretreatment for polymers and polymer composites", Proceedings of ACCE'97, Detroit, Mich.; C. L. Weitzsacker et al., "Surface pretreatment of plastics and polymer composites using ultraviolet light", Proceedings of ACT'97, Detroit, Mich.; N. Dontula et al., "Surface activation of polymers using ultraviolet activation", Proceedings of Society of Plastics Engineers ANTEC'97, Toronto, Canada. Haack, L. P., et al., 22nd Adhesion Soc. Meeting (Feb. 22 to 24, 1999).

Non-pulsed, low intensity UV lamps have been used by the prior art. These are described in: "Experimental Methods in Photochemistry", Chapter 7, pages 686 to 705 (1982). U.S. Pat. No. 5,098,618 to Zelez is illustrative of the use of these types of lamps. The UV light is preferably at 185 and 254 nm wavelengths in the presence of oxygen which generates atomic oxygen and ozone. The result is that the surfaces are more hydrophilic. The treatments are for 5 to 120 minutes which is a relatively long time. The lamps are low pressure and have an intensity of 10 to 15 m-Watts/cm$^2$. The substrate is a distance of no more than 1.25 cm. The lamps are relatively low power and thus require a long treatment time.

There are multiple prior art processes for the surface treatment of carbon fibers. Carbon fibers are routinely used in aerospace, automotive, recreational, and durable goods markets. Three major methods are currently practiced: 1. Anodic oxidation, a wet process where the proper voltage and electrolyte solution concentration must be maintained; 2. Exposure to ozone gas at elevated temperature, where ozone concentration and temperature must be maintained; and 3. Treatment in caustic solutions such as nitric acid, where solution strength and treatment time must be maintained. Organic polymer fiber composites are experiencing 15% annual growth and a new method of fiber surface treatment could find applications in both fiber-thermoset and fiber-thermoplastic matrix composites.

U.S. Pat. No. 3,723,607 to Kalnin describes a process wherein carbon fibers are heated to 900 to 1400° C. in an inert atmosphere and then subsequently heated in ozone at 75° to 175° C. for a period of time of at least 30 seconds. The process is expensive because of the heating steps. The process provides oxygen on the surface of the fibers and improved composite strength.

U.S. Pat. No. 3,754,957 to Druin also shows the need for treating the surface of carbon fibers with oxygen. The fibers are heated at 1000° C. to 1800° C. in the presence of oxygen. The fibers form better composites.

U.S. Pat. No. 4,832,932 to Tada et al describes treating fibers to increase the oxygen content of the surface. Various methods are described including heating in ozone at 200° C. This patent also shows the need for providing oxygen in the surface part of the fibers.

Thus, there is a clear need to provide an oxygenated carbon fiber surface which provides for the preparation of improved composites. The problem is that the prior art processes require considerable amounts of energy, create waste products, require careful control and thus are expensive. There is a need for an improved process.

A disadvantage of the ultraviolet lamp fiber treatments of the prior art is that they are time consuming and sometimes unreliable. To achieve suitable surface chemistries for adhesive bonding and painting purposes, exposure times for certain materials like polypropylene, thermoplastic olefins (TPO's) tend to be of the order of 5 to 60 minutes. In many cases, there is a limit on the length of time to which one may expose the substrates to UV since there is a fear of degrading the fiber. There is a need for development of an environmentally friendly as well as cost effective and robust surface treatment process which can be used over a range of surfaces.

OBJECTS

It is therefore an object of the present invention to provide a process and an apparatus which produces a surface treated fiber with enhanced wettability by matrix or adhesive polymers, and superior bondability to these polymers. In particular, an object of this invention is to modify the surfaces of reinforcing fibers to promote wetting, chemical compatibility, and adhesion between fibers and polymers in composites. The process saves time, conserves energy and is cost effective, reliable and environmentally acceptable compared to current technologies. These and other objects will become increasingly apparent by reference to the following description and the drawings.

SUMMARY OF THE INVENTION

The present invention relates to a process for binding oxygen on a surface of a carbon fiber which comprises:
  irradiating the surface of the fiber with ultraviolet light at a high intensity between about 1 to 40 watts/cm$^2$ to modify the surface which is moving relative to a source of the ultraviolet light in an ozone atmosphere, wherein the wavelengths are between about 160 nanometers and 500 nanometers without higher wavelengths, wherein the irradiated fiber surface contains the bound oxygen from the ozone.

The present invention also relates to an apparatus for binding a surface of a fiber containing carbon comprising:
  (a) an annular light source for irradiating the fiber and, wherein the light source irradiates the fiber at a high intensity between about 1 and 40 watts/cm$^2$ at wavelengths ranging from about 160 to 500 nanometers without higher wavelengths;
  (b) a flow directing means for providing flowing ozone on the surface of the fiber during the irradiating by the light source; and
  (c) an electrical power supply operably coupled to power the optical energy source wherein the fiber after irradiating contains bound oxygen from the ozone.

The advantages of the present process are: short treatment times which are conducted at ambient temperature and pressure. The process does not involve the use of caustic acids or solutions, is environmentally acceptable, and is amenable to both inorganic and organic fibers such as but not limited to carbon, glass, ceramic, metallic, polymeric, calcium phosphate, aramid, polyolefin, and natural fibers such as jute, henequen, hemp, and others, and nanophase composites. The process is economically competitive or superior to old processes; can be used on continuous or discontinuous fibers.

The basis of operation of the new process is the application of high intensity pulsed, ultraviolet light in the presence of ozone. The fibers to be treated are subjected to short wavelength ultraviolet light, 180 to 500 nm wavelength, in the presence of flowing ozone gas. The ultraviolet light interacts with ozone to create monatomic oxygen, a highly reactive chemical species which is available to react with the fibers. Additionally, the energetic ultraviolet light can interact with the fiber surface to disrupt and change chemical bonds and create favorable conditions for interaction with the ozone and monatomic oxygen. The result of this twofold process is the rapid oxygenation of the fiber surface that is essential to promote favorable interactions with the matrix in polymer composites. A schematic of one design for the treatment of continuous fibers is provided in FIG. 1.

In the present invention it was discovered that if higher wavelengths of light above about 500 nm are used, the surface of the fiber is heated unnecessarily. A thermoplastic fiber would be heated unnecessarily. This allows the newly formed chemically active groups to rotate into the melted surface thus, decreasing the activity of the surface. On inorganic fiber surfaces, desorption of the functional groups can take place, negating the beneficial effect. By limiting the wavelengths produced by the UV lamp or by the use of filters, the light above 500 nanometers can be largely eliminated.

The process of the present invention is cost effective for pretreatment of surfaces of fibers composed of carbon containing materials such as carbon polymers and polymer composites. The process creates beneficial surface chemistries for adhesive bonding. The advantages of this process over the existing prior art is that the process is cheaper than chemical modification techniques such as plasma and is not a batch process as with plasma and acid etching. The process is environmentally friendly as compared to solvent wash, acid etching and mechanical abrasion techniques. The process is much cheaper than processes using UV exciter lasers which are cost intensive and work on the principle of ablating the surface layers or roughening the surface or amorphizing the top surface layers. In comparison to the existing ultraviolet lamp techniques, the current process reduces the process times for treating fiber surfaces (thus making it less expensive, and avoiding degradation of the substrates) and achieves surface modifications which were not possible. This invention is used to tailor the chemistry of the fiber surface by using ozone between the substrate surface and ultraviolet light. The process can be particularly used for treating carbon fibers prior to their use in composites, in particular. This process is an easier, flexible or alternate way for them to create materials with different surface and adhesion properties to polymer matrices.

The substance and advantages of the present invention will become increasingly apparent by reference to the following drawings and the description.

DESCRIPTION OF THE PREFERRED EMBODIMENTS

Carbon, glass and organic fibers require modification of their surface chemistry or structure in order to achieve acceptable levels of adhesion in polymer composites. Typically, these surface modifications result in enhanced oxygen content of the fiber surface which has the beneficial effect of increasing fiber wettability as well as promoting the number of active sites for the development of chemical bonds between the fiber and polymer.

Figure 1:
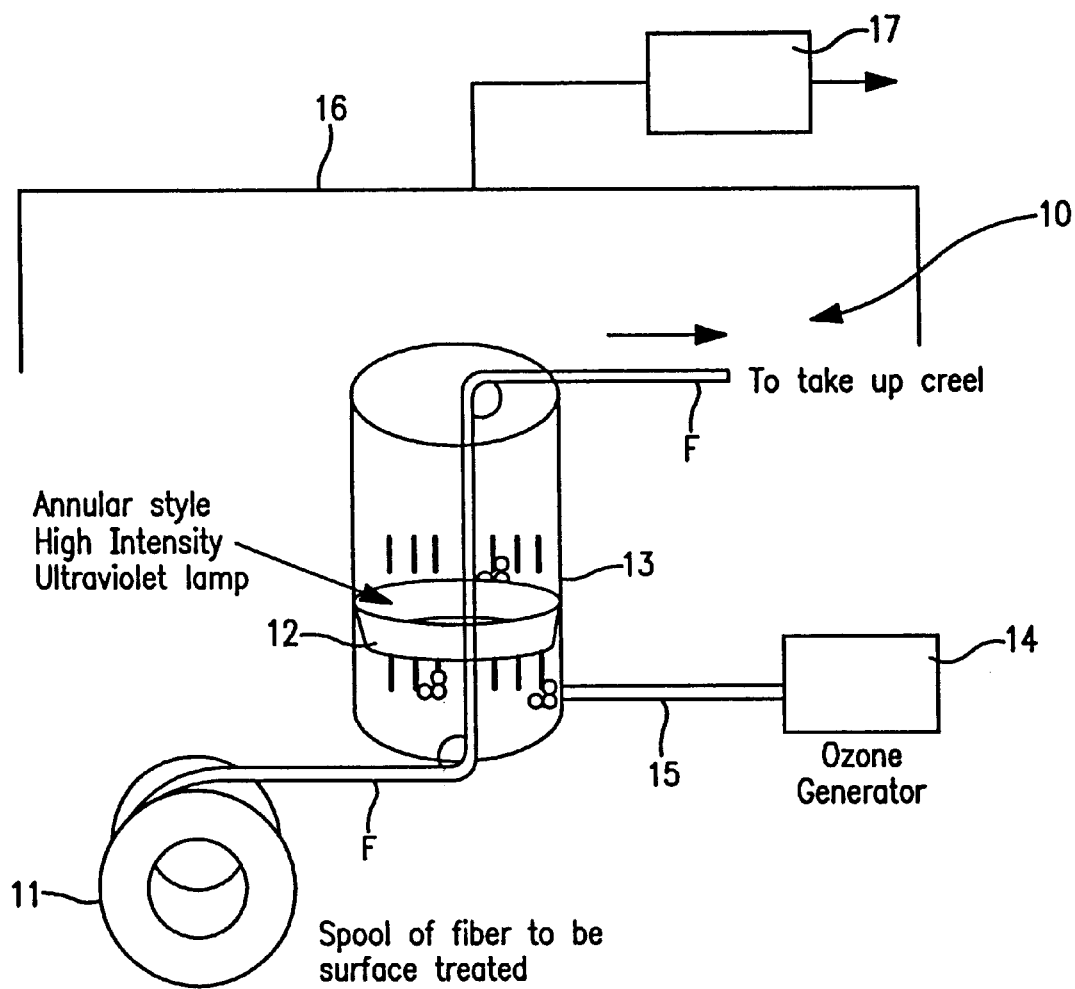
FIG. 1 is a schematic perspective view of the apparatus 10 for continuously treating a fiber F.

FIG. 1 shows an apparatus 10 for supplying a fiber from a spool 11. The UV light is provided by an annular high intensity UV lamp 12 inside a cylindrical container 13. Ozone is supplied from a generator 14 via a conduit 15 to the bottom of the container 13. In FIG. 1, the ozone is supplied at the bottom of the container 13 and flows upwards in the direction of the moving fiber F. A hood 16 and vacuum source 17 are used to remove excess ozone and any decomposition products. Obviously other arrangements for supplying the ozone can be used.

The surface of the fiber is exposed to a UV flashlamp emitting the radiation in the required wavelength range (180 nm –500 nm), all of which are less than 500 nm. Process times are regulated by the distance of the UV lamp or flashlamp from the fiber surface, ambient temperature or condition and the extent of surface modification needed. The distance of the UV lamp or flashlamp from the fiber surface determines the intensity of UV radiation at the surface substrate.

In the continuous process with the moving fiber, the lamps are arranged to irradiate all surfaces, such as a tunnel of lamps.

X-ray photoelectron spectroscopy (XPS) is used to characterize the surface chemical composition of the substrates. XPS results show an increase in the oxygen content of the carbon fibers after UV treatment.

The treated fibers were characterized for surface chemical composition. X-ray photoelectron spectroscopy (XPS) was used to characterize the fiber surfaces for a change in chemical composition after UV treatment. A Perkin-Elmer Physical Electronics PHI5400 ESCA Spectrometer equipped with both a standard Mg K$\alpha_{1,2}$ X-ray source, and a monochromated Al K$\alpha_{1,2}$ X-ray source, and an electron flood gun for neutralization was used. The instrument uses a 180° hemispherical energy analyzer operated in the fixed analyzer mode and a position sensitive detector. The instrument has variable apertures available from spot sizes of 250 $\mu$m to a rectangle of 1.5×5 mm. The optimum spot size for the conditions used in these experiments is the 1.00 mm diameter aperture. Resolution settings for collecting data are 89.45 eV for survey (wide window) scans, 35.75 eV for utility resolution and 17.90 eV for high resolution scans.

Use of the monochromatic source on a non-conducting sample necessitates the use of a neutralization source. This instrument utilizes a low energy electron flood gun. Prior to establishing the baseline chemistry of untreated polymers, the neutralizer operating conditions had to be optimized. This was accomplished by first aligning the neutralizer with mylar, followed by using these conditions on the baseline TPO and polycarbonate samples. The peak shape of the C1s was used to assess the neutralizer operation. An asymmetric C1s peak was initially observed. To determine if this was real or due to the neutralizer, the specimen was analyzed using the standard Mg source set to 150W, 15 kV. Lower power was used to minimize damage that may occur when the non-monochromatic source is used. It was concluded that the asymmetry was an artifact of the neutralizer. The operating conditions were adjusted through several iterations until the C1s peak shape was symmetric. A molybdenum mask was employed to assist in neutralizing the charging occurring in the samples, where the mask attracts electron and causes a distribution of electrons to spread across the sample surface. Use of the mask has improved the reproducibility of neutralizing, allowing the same neutralizer setting to be used from sample to sample.

The following Examples show the results of surface modification of reinforcing fibers and plastic fillers by the application of high intensity ultraviolet light in the presence of ozone. In this process, fibers, fillers, and other compounds are subjected to short wavelength ultraviolet light, 180 to 500 nm wavelength, in the presence of flowing ozone gas. Ultraviolet light interacts with ozone to create monatomic oxygen, a highly reactive chemical species which is available to react with fibers and fillers. Additionally, the energetic ultraviolet light interacts with the fiber surface to disrupt and change chemical bonds between surface atoms and create favorable conditions for reaction with ozone and monatomic oxygen. The result of this two-fold process is the rapid oxygenation of the surface that results in an increase in surface energy and the potential for surface reactivity with reactive chemical groups in polymers, plastics, paints, and other materials that require good adhesion for their performance.

EXAMPLE 1

Carbon fibers were selected to demonstrate the efficacy of the new process. These high strength fibers require surface treatment in order to achieve sufficient levels of adhesion in polymer composites. Recent efforts have documented changes in surface chemistry showing that the UV+Ozone treatment rapidly increases the amount of oxygen on the fiber surface. Tensile strength measurements of the treated fibers showed an increase following treatment. The interfacial shear strength, a measure of fiber-matrix adhesion, of the UV+Ozone treated fibers was approximately twice that of the untreated fibers. These results show that this new fast and inexpensive process is effective at promoting fiber to polymer adhesion without sacrificing fiber mechanical properties.

AU4 carbon fibers, representative of aerospace grade fibers, were used in the following Example. The fibers were obtained from the manufacturer (Hexcel Fibers Inc., Salt Lake City, Utah) in an "as received" state as it existed coming from the carbonizing reactor and these fibers do not possess any surface treatment. AU4 fibers do not develop sufficient levels of adhesion with polymeric matrices, which disqualifies this fiber for use in engineering composites.

Experimental.

1. UV+Ozone Treatment.

AU4 fibers were subjected to ultraviolet light in the presence in flowing ozone gas in the apparatus of FIG. 1. Fibers were treated to various levels followed by subsequent evaluation for surface chemistry, tensile strength, and adhesion to an epoxy matrix.

2. Surface Chemical Analysis.

The chemistry of the AU4 fiber surface was evaluated by x-ray photoelectron spectroscopy. A surface sensitive technique, XPS irradiates a sample with high energy x-rays and measures the kinetic energy of the emitted photoelectrons. The kinetic energy of these electrons can easily be converted to a binding energy and thus, significant qualitative information concerning the surface (top 5–8 nm) is determined. Molecular information is elucidated from small shifts in the binding energy. Semi-quantitative information concerning the surface is determined by measuring peak areas and applying the appropriate sensitivity factors. The measurements were performed using a PHI-5400 ESCA™ (Physical Electronics Inc., Eden Prairie, Minn.) work station. X-Ray photons were generated from a polychromatic Mg anode (1254 eV). The analyzer was operated in the fixed energy mode employing a pass energy of 89.45 eV for survey scans and 17.9 eV for utility scans.

Figure 2:
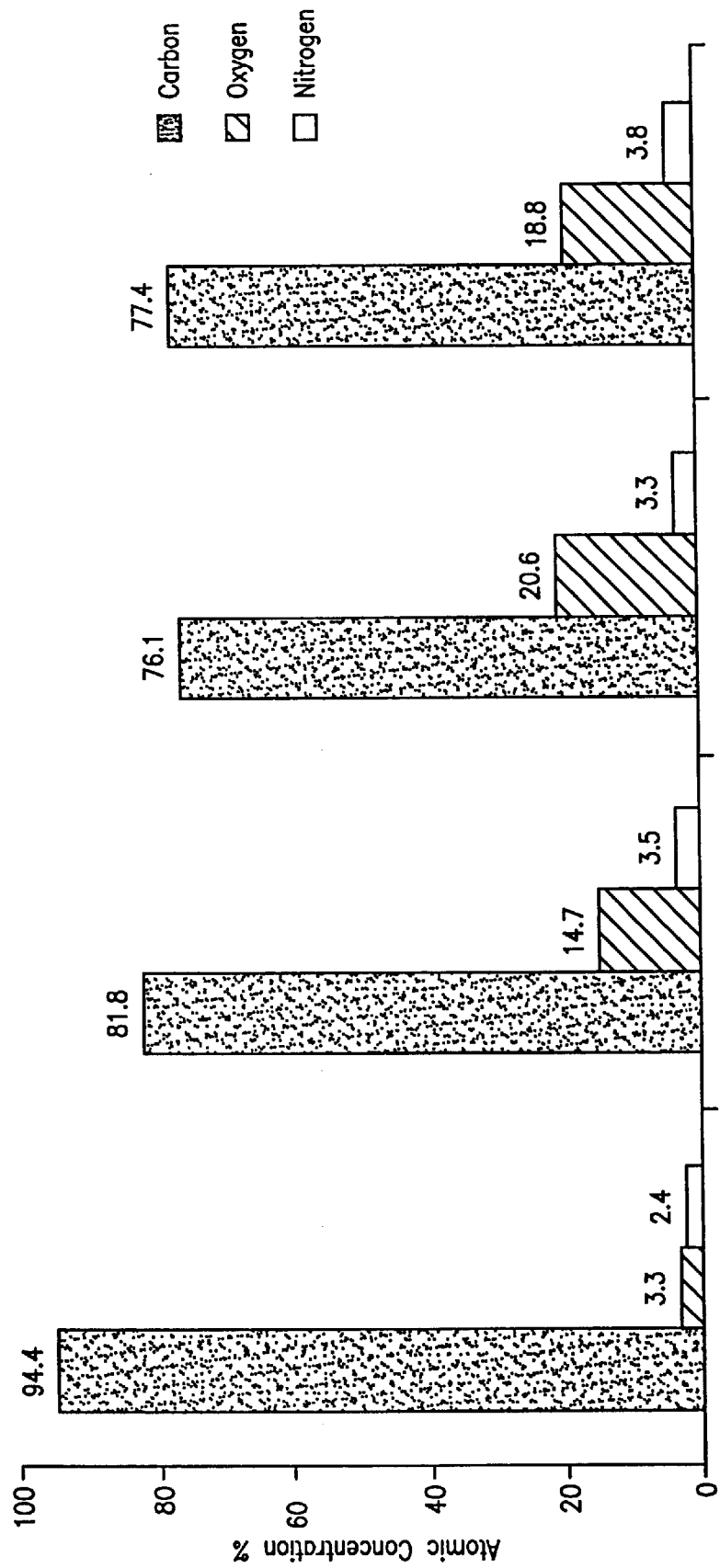
FIG. 2 is a graph showing oxygen concentration of the fiber as a function of treatment time by the present process.

FIG. 2 is a summary chart showing the rapid rise in surface oxygen concentration as a function of treatment time. The AU4 fiber has an initial surface oxygen concentration of 3.3%. The oxygen concentration increased to 14.7% following a 60 second treatment to the UV+Ozone process, and reached a maximum after 90 seconds at 20.6 atomic percent, which is equivalent to or greater than the current methods used commercially. The oxygen enriched fiber surfaces result in superior composite properties relative to untreated fibers of the same type when fabricated into a polymer matrix composite as previously discussed.

3. Fiber Tensile Strength Measurements.

Fiber tensile strength was measured using ASTM method D3379 for single filament materials. Individual fibers were tested on a 500 gram load cell to determine the tensile strength. Data are presented in Table 1 for the untreated AU4 fiber and in Table 2 for AU4-90 second UV+Ozone treated fiber. The AU4-90 sec UV+Ozone treated fibers exhibited a greater tensile strength than their untreated counterpart.

TABLE 1

Tensile Strength of AU4 "As Received" Carbon Fiber

| AU4 Test Speed 0.02 inches per minute | Diameter (inch) | Max Load (lbs) | Tensile Strength (psi) |
|---|---|---|---|
| 1 | 0.000311 | 0.0177 | 233004 |
| 2 | 0.000323 | 0.0413 | 504029 |
| 3 | 0.000335 | 0.0236 | 267752 |
| 4 | 0.000307 | 0.0305 | 412034 |
| 5 | 0.000307 | 0.0222 | 299907 |
| 6 | 0.000335 | 0.0316 | 358516 |
| 7 | 0.000311 | 0.0382 | 502867 |
| 8 | 0.000323 | 0.0288 | 351478 |
| 9 | 0.000323 | 0.0286 | 349037 |
| 10 | 0.000319 | 0.0355 | 444178 |
| 11 | 0.000319 | 0.0378 | 472956 |
| 12 | 0.000327 | 0.0331 | 394133 |
| 13 | 0.000315 | 0.0361 | 463230 |
| 14 | 0.000323 | 0.0312 | 380768 |
| 15 | 0.000307 | 0.0300 | 405280 |
| 16 | 0.000315 | 0.0300 | 384956 |
| 17 | 0.000331 | 0.0354 | 411394 |
| 18 | 0.000331 | 0.0274 | 318423 |
| 19 | 0.000327 | 0.0394 | 469149 |
| 20 | 0.000346 | 0.0267 | 283968 |
| 21 | 0.000323 | 0.0368 | 449111 |
| Average | 0.00032181 | 0.315 | 388389 |
| Standard Deviation | 1.04001E−05 | 0.0060 | 77511 |
| Coefficient of Variation | 3.23% | 19.1% | 19.96% |

TABLE 2

Tensile Strength of AU4-UV + Ozone Treated Fibers.

| AU4-90 sec UV + O3 Test Speed 0.02 inches per minute | Diameter (inch) | Max Load (lbs) | Tensile Strength (psi) |
|---|---|---|---|
| 1 | 0.000315 | 0.0225 | 288789 |
| 2 | 0.000315 | 0.0366 | 469763 |
| 3 | 0.000303 | 0.0406 | 562500 |
| 4 | 0.000307 | 0.0303 | 409102 |
| 5 | 0.000315 | 0.0295 | 378634 |
| 6 | 0.000307 | 0.0207 | 279485 |
| 7 | 0.000327 | 0.0376 | 448342 |
| 8 | 0.000315 | 0.0360 | 462062 |
| 9 | 0.000323 | 0.0297 | 362833 |
| 10 | 0.000327 | 0.0388 | 462005 |
| 11 | 0.000295 | 0.0359 | 525244 |
| 12 | 0.000307 | 0.0267 | 360699 |
| 13 | 0.000311 | 0.0325 | 427832 |
| 14 | 0.000335 | 0.0281 | 318807 |
| 15 | 0.000303 | 0.0371 | 514516 |
| 16 | 0.000311 | 0.0261 | 343582 |
| 17 | 0.000307 | 0.0368 | 497143 |
| 18 | 0.000307 | 0.0351 | 474177 |
| 19 | 0.000287 | 0.0385 | 595124 |
| Average | 0.000311 | 0.0326 | 430560 |
| Standard Deviation | 0.000011 | 0.0058 | 90148 |
| Coefficient of Variation | 3.6% | 17.9% | 20.9% |

EXAMPLE 2

4. Interfacial Shear Strength.

The interfacial shear strength, a measurement of the level of adhesion between fiber and polymer, was determined using the single fiber fragmentation test. The single fiber fragmentation test incorporates a single fiber in a microtensile coupon. Tensile loading causes the encapsulated fiber to fracture into successively shorter lengths within the coupon, ultimately reaching the critical transfer length, $l_c$. The experimentally derived value of $l_c$ is related to the interfacial shear strength (IFSS), $\tau$, by a shear lag analysis resulting in the relationship $$\tau = \frac{\sigma_f}{2} \frac{d}{l_c}$$

where $\sigma_f$ is the fiber tensile strength and d is the fiber diameter. The untreated and treated carbon fibers were evaluated in Epon 828 (Shell Chemicals USA, Houston, Tex.) epoxy resin cured with 1,3-phenylene diamine to determine the effect of the UV+Ozone treatment on the interfacial shear strength. For comparison, data are included for the commercially treated AS4 fiber tested in the same epoxy matrix. Results are summarized in Table 3. The experimentally measured tensile strengths for the AU4 and the AU4-UV+Ozone fibers were used in the calculation of the interfacial shear strength. For comparison, results are included for the commercially available surface treated fiber AS4. The results show that the interfacial shear strength of AU4-90 sec UV+Ozone is more than twice that of the untreated baseline AU4 fiber. Furthermore, the AU4-90 sec UV+Ozone interfacial shear strength is greater than the commercially treated AS4 carbon fiber.

TABLE 3

Effect of UV + Ozone Treatment on Interfacial Shear Strength of AU4 Carbon Fiber

|  | AU4 | AU4-90s UV + Ozone | AS4[1] |
| --- | --- | --- | --- |
| Average Diameter (inch) | 0.000328 | 0.000306 | 0.000301 |
| Critical Transfer Length (inch) | 0.031 | 0.014 | 0.0196 |
| Tensile Strength (psi) | 388390 | 430560 | 446760 |
| IFSS (psi) | 2050 | 4705 | 3538 |

[1]AS4 is the commercially treated AU4 fiber.

The UV+Ozone treatment results in an oxygen enriched surface that is known to be essential for the development of sufficient levels of adhesion in polymer composites. Evaluation of tensile strength proved that the new treatments may improve the mechanical properties of carbon fibers. Fibers subjected to the new treatment resulted in more than a two-fold improvement in interfacial shear strength, attaining a level greater than commercially treated fibers. The new process of utilizing energetic ultraviolet light in the presence of ozone has been demonstrated to effectively treat carbon fibers for their use in polymer composites and that the new process offers promise to exceed that of the old processes now used in the carbon fiber industry.

It is intended that the foregoing description be only illustrative of the present invention and that the present invention be limited only by the hereinafter appended claims.

We claim:

1. An apparatus for binding oxygen on a surface of a carbon containing fiber comprising:

(a) an annular light source inside a vertically oriented cylindrical container for irradiating the fiber as the fiber move vertically through the inside of the annular light source and, wherein the light source irradiates the fiber at a high intensity between about 1 and 40 watts/cm$^2$ at wavelengths ranging from about 160 to 500 nanometers without higher wavelengths;

(b) supply means for providing flowing ozone in the container which directs flow of the ozone from a lower portion of the container upwards on the surface of the fiber inside of the container during the irradiating by the light source; and (c) an electrical power supply operably coupled to power the optical energy source wherein the fiber after irradiating contains bound oxygen from the ozone.

2. The apparatus of claim 1, further including:

(a) a hood for supporting the light source and for enshrouding the irradiated surface to capture a substantial amount of any photodecomposed molecules and ozone from the container; and (b) a vacuum system coupled to collect the photodecomposed molecules and ozone captured by the hood for recycle or reuse.

3. The apparatus of claim 1 or 2 wherein a spool is provided for supplying the fiber to the container and a creel for taking up the fiber after the movement through the container.

4. An apparatus for binding oxygen on a surface of a carbon containing fiber comprising:

(a) an annular light source inside a cylindrical container for irradiating the fiber as the fiber moves vertically through the annular light source constructed to generate ozone between the lamp and fiber surface as a result of flowing air or oxygen on the surface of the fiber during the irradiating by the light source;

(b) a supply means for providing flowing ozone in the container which directs flow of the zone from a lower portion of the container upwards on the surface of the fiber inside the container during the irradiating by the light source; and c) an electrical power supply operably coupled to power the optical energy source wherein the fiber after irradiating contains bound oxygen front the ozone.

5. The apparatus of claim 4 further including:

(a) a hood for supporting the light source and for enshrouding the irradiated surface to capture a substantial amount of any photodecomposed molecules and ozone from the container; and (b) a vacuum system coupled to collect the photodecomposed molecules and ozone captured by the hood for recycle or reuse.

6. The apparatus of claims 4 or 5 wherein a spool is provided for supplying the fiber to the container and a creel for taking up the fiber after movement through the container.

* * * * *

UNITED STATES PATENT AND TRADEMARK OFFICE
CERTIFICATE OF CORRECTION

PATENT NO. : 6,648,973 B1  Page 1 of 1
DATED : November 18, 2003
INVENTOR(S) : Lawrence T. Drzal and Michael J. Rich It is certified that error appears in the above-identified patent and that said Letters Patent is hereby corrected as shown below:

<u>Column 1,</u>
Line 7, "filed Jan. 15, 2001," should be -- filed Jun. 15, 2001, --.

<u>Column 9,</u>
Line 38, "move vertically" should be -- moves vertically --.

<u>Column 10,</u>
Line 34, "oxygen front" should be -- oxygen from --.

Signed and Sealed this

Thirteenth Day of April, 2004

JON W. DUDAS
*Acting Director of the United States Patent and Trademark Office*